(12) United States Patent
Shen et al.

(10) Patent No.: US 11,522,192 B2
(45) Date of Patent: Dec. 6, 2022

(54) ZINC ORGANIC BATTERY AND APPLICATION THEREOF

(71) Applicant: HUAZHONG UNIVERSITY OF SCIENCE AND TECHNOLOGY, Hubei (CN)

(72) Inventors: Yue Shen, Hubei (CN); Jintao Meng, Hubei (CN); Liangyi Zhou, Hubei (CN); Yiding Shen, Hubei (CN); Yunhui Huang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 252 days.

(21) Appl. No.: 16/920,436

(22) Filed: Jul. 3, 2020

(65) Prior Publication Data
US 2022/0006088 A1    Jan. 6, 2022

(51) Int. Cl.
*H01M 4/60*    (2006.01)
*H01M 10/36*   (2010.01)
*H01M 4/38*    (2006.01)
*H01M 4/02*    (2006.01)

(52) U.S. Cl.
CPC ............. *H01M 4/60* (2013.01); *H01M 4/38* (2013.01); *H01M 10/36* (2013.01); *H01M 2004/021* (2013.01); *H01M 2300/0002* (2013.01)

(58) Field of Classification Search
CPC .......... H01M 4/60; H01M 4/38; H01M 10/36; H01M 2004/021; H01M 2300/0002
See application file for complete search history.

(56) References Cited

FOREIGN PATENT DOCUMENTS

| CN | 108574085 A | * | 9/2018 | .......... H01M 10/054 |
| CN | 109994785 | | 7/2019 | |

OTHER PUBLICATIONS

Guo et al. CN 108574085A. Sep. 25, 2018. English machine translation. (Year: 2018).*

* cited by examiner

*Primary Examiner* — James Lee
(74) *Attorney, Agent, or Firm* — JCIP Global Inc.

(57) ABSTRACT

The invention discloses a zinc organic battery having a container. The container contains a positive electrode active material, a positive electrode current collector, an organic solvent, a zinc negative electrode, and an aqueous electrolyte. The organic solvent and the aqueous electrolyte are not miscible and are layered due to different densities. The positive electrode active material has a redox activity, and has the two forms of an oxidized state and a reduced state. If the positive electrode active material itself is a liquid and is difficult to be dissolved in the aqueous electrolyte, then the organic solvent may be omitted. The positive electrode active material itself doubles as the organic solvent and is layered with the aqueous electrolyte. The zinc negative electrode is immersed in the aqueous electrolyte and is not in contact with the organic solvent. The aqueous electrolyte is an aqueous solution containing a zinc salt.

19 Claims, 5 Drawing Sheets

ZINC ORGANIC BATTERY AND APPLICATION THEREOF

BACKGROUND OF THE INVENTION

Field of the Invention

The invention belongs to the field of batteries, and more specifically, relates to a zinc organic battery and application thereof.

Description of Related Art

The effective use of new energy sources, such as solar energy and wind energy, is the hope for solving human energy issues. Solar energy and wind energy are intermittent, volatile, and random, and may not guarantee the electricity needs of the population in time. Therefore, an energy storage technique is needed to store the electrical energy generated by solar energy and wind energy and release it when needed.

Among energy storage techniques, the energy storage battery technique has advantages such as high energy efficiency and no geographical restrictions, and has become a key development target of countries around the world.

The performance requirements of batteries used for energy storage in the power grid are quite different from other rechargeable batteries. They require low cost, easy mass production, long cycle life, no environmental pollution, and have to be safe and reliable. However, the requirements for energy density thereof are not high. At present, batteries that have been tried for power grid energy storage applications include: lead-acid batteries, lithium-ion batteries, flow batteries, high-temperature sodium-sulfur batteries, liquid metal batteries, etc. However, there are still issues such as high cost, insufficient life expectancy, difficult recycling, and hidden safety hazards, and therefore the needs of power grid energy storage applications may not be met.

In view of the above defects and improvement needs of the prior art, a new type of battery needs to be developed.

In view of the above defects or improvement needs of the prior art, the invention provides a new type of battery, which is to achieve a large rechargeable battery with high cycle life and high safety at a very low manufacturing cost to meet the needs of large-scale energy storage application.

SUMMARY OF THE INVENTION

According to an aspect of the invention, a zinc organic battery is provided. The zinc organic battery has a container. The container contains a positive electrode active material, a positive electrode current collector, an organic solvent, a zinc negative electrode, and an aqueous electrolyte, wherein,
  the organic solvent is not miscible with the aqueous electrolyte, and the two have different densities and are able to be layered under an action of gravity;
  the solubility of the oxidized state of the positive electrode active material in the organic solvent is greater than the solubility thereof in the aqueous electrolyte.

According to an aspect of the invention, a zinc organic battery is further provided. The zinc organic battery has a container. The container contains a positive electrode active material, a positive electrode current collector, a zinc negative electrode, and an aqueous electrolyte, wherein,
  the positive electrode active material itself is a liquid and is difficult to be dissolved in the aqueous electrolyte, and the positive electrode active material and the aqueous electrolyte have different densities and are able to be layered under an action of gravity;
  for the above two aspects, the positive electrode active material has a redox activity and has two forms—an oxidized state and a reduced state, and the two forms are able to be reversely converted by an electrochemical reaction, molar ratios of the oxidized state and the reduced state are different, which correspond to different battery charge states, and when a content of the oxidized state is high, the battery is in a high charge state, and when a content of the reduced state is high, the battery is in a low charge state;
  the positive electrode current collector is used to collect a current at a positive electrode;
  the main component of the zinc negative electrode is zinc, and the zinc negative electrode is immersed in the aqueous electrolyte and is not in contact with the positive electrode active material;
  the aqueous electrolyte is an aqueous solution containing a zinc salt.

Further, the positive electrode active material is selected from one of the following four types:
  the first type: a halogen, wherein an oxidized state thereof is an anion formed by a halogen element or three halogen atoms, and a reduced state thereof is an ion thereof, comprising $Br_2/Br^-$, $I_2/I^-$, $Br_3^-/Br^-$, $I_3^-/I^-$;
  the second type: alkyl ferrocene, wherein an oxidized state thereof is an alkyl ferrocene (III) ion, and a reduced state thereof is alkyl ferrocene (II), comprising an octyl ferrocene ion $C_{18}H_{26}Fe$ (III)$^+$/octyl ferrocene $C_{18}H_{26}Fe$ (II);
  the third type: the positive electrode active material is 2,2,6,6-tetramethylpiperidine oxide TEMPO, a molecular formula thereof is $C_9H_{18}NO$, TEMPO$^+$ is the oxidized state of the positive electrode active material, and TEMPO is the reduced state of the positive electrode active material;
  the fourth type: the oxidized state of the positive electrode active material is quinone, the reduced state thereof is corresponding phenol, comprising tetrachloro-p-benzoquinone $C_6Cl_4O_2$/tetrachloro-p-hydroquinone $C_6(OH)_2Cl_4$.

Further, an organic ionic compound is also included. The organic ionic compound is used to balance a charge state of the positive electrode active material during a charge and discharge process to ensure overall electrical neutrality, the following are included: lithium bistrifluoromethane sulfonimide (LiTFSI), wherein a molecular formula thereof is: $(CF_3SO_2)_2NLi$, dioctyl sodium sulfosuccinate (AOT), wherein a molecular formula thereof is: $(COOC_8H_{17})CH_2CH(COOC_8H_{17})SO_3Na$, tetra-n-butylammonium bis(trifluoromethansulfonyl)imide (TBATFSI), wherein a molecular formula thereof is: $(CF_3SO_2)_2N_2C_{16}H_{36}$.

Further, the battery has two or more positive electrode current collectors that are not directly communicated with each other.

Further, the organic solvent is selected from an ether solvent, a fatty acid, or an ester solvent, wherein,
  the ether solvent includes tetrahydrofuran (molecular formula $(CH_2)_4O$), 1,4-dioxane (molecular formula $C_4H_8O_2$), tetraethylene glycol dimethyl ether (molecular formula $CH_3O(CH_2CH_2O)_4CH_3$);
  the fatty acid includes hexanoic acid (molecular formula $C_5H_{11}COOH$);
  the ester solvent includes butyl acetate ($CH_3COOC_4H_9$).

Further, the positive electrode current collector is formed by a porous conductive material, the porous conductive material includes graphite felt, the positive electrode current collector is located at the organic solvent or at an interface of the organic solvent and the aqueous electrolyte, and the positive electrode current collector is rotatable.

Further, the density of a solution formed by dissolving the positive electrode active material in the organic solvent is lower than that of the aqueous electrolyte, the organic solvent and the positive electrode active material are at an upper layer, the aqueous electrolyte is at a lower layer, and the zinc negative electrode is at a bottommost layer and immersed in the aqueous electrolyte and is not in contact with the organic solvent.

Further, the density of a solution formed by dissolving the positive electrode active material in the organic solvent is greater than that of the aqueous electrolyte, the organic solvent and the positive electrode active material are at a lower layer, the aqueous electrolyte is at an upper layer, and the zinc negative electrode is suspended at the aqueous electrolyte, and is not in contact with the organic solvent.

Further, the density of a solution formed by dissolving the positive electrode active material in the organic solvent is greater than that of the aqueous electrolyte, and a bottom of the container has a plurality of grooves, wherein a portion of the grooves is provided with the zinc negative electrode, and another portion of the grooves is provided with the positive electrode active material and the organic solvent.

According to the third aspect of the invention, an application of the zinc organic battery above in the field of energy storage is also provided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Generally speaking, compared with the prior art, the above technical solutions conceived by the invention may achieve the following beneficial effects:

In a technical solution of the invention application, under the action of gravity, the battery is automatically divided into the three layers of organic solvent (the positive electrode active material is dissolved in the organic solvent)-aqueous electrolyte-zinc negative electrode or divided into the three layers of positive electrode active material-aqueous electrolyte-zinc negative electrode without the need to separate the positive and negative electrodes. The reactants of the electrochemically active materials involved in battery work may be quickly conducted by convection in an aqueous electrolyte or organic solvent, thereby increasing current density. Moreover, such a design enables the battery to have stable electrochemical properties of the organic solvent and high solubility for the positive electrode active material, as well as the use of aqueous electrolyte to prevent the burning of the organic solvent to improve the safety of the battery. Moreover, the battery material and structure of the invention are simple, and the manufacturing cost is low. Since the dendrite issue of the negative electrode may be overcome, the cycle life thereof is higher. Therefore, a large rechargeable battery with high cycle life and high safety may be achieved at a very low manufacturing cost to meet the application of large-scale energy storage.

According to an aspect of the invention, a zinc-organic battery having a container is provided. The container contains a positive electrode active material, a positive electrode current collector, an organic solvent, a zinc negative electrode, and an aqueous electrolyte, wherein the organic solvent is not miscible with the aqueous electrolyte, the two have different densities, and are able to be automatically layered under the action of gravity. The positive electrode active material has redox activity and has the two forms of oxidized state and reduced state. The two forms are able to be reversibly converted by electrochemical reaction. The different molar ratios correspond to different battery charge states. When the content of the oxidized state is high, the battery is in a high charge state, and when the content of the oxidized state is low, the battery is in a low charge state and needs to be charged.

The solubility of the oxidized state of the positive electrode active material in the organic solvent is greater than the solubility thereof in the aqueous electrolyte, so the oxidized state of the positive electrode active material is enriched in the organic solvent under the action of the extraction mechanism or salting-out mechanism without direct contact with the zinc negative electrode to avoid self-discharge. The solubility of the reduced state of the positive electrode active material in the organic solvent is not particularly limited, because even if the reduced state of the positive electrode active material is dissolved in the aqueous electrolyte, a redox reaction with the zinc negative electrode may not necessarily occur.

If the positive electrode active material itself is a liquid and difficult to be dissolved in the aqueous electrolyte, then the organic solvent may be omitted. That is, the positive electrode active material itself doubles as an organic solvent and is layered with the aqueous electrolyte. The liquid state positive electrode active material itself as an organic solvent is that the content ratio of the positive electrode active material is higher, so that battery energy density greater.

The main component of the zinc negative electrode is zinc, and the zinc negative electrode is immersed in the aqueous electrolyte and is not in contact with the organic solvent. When the density of the organic solvent is less than the aqueous electrolyte, the organic solvent is in the upper layer, the aqueous electrolyte is in the lower layer, and zinc powder is immersed in the lower half portion of the aqueous electrolyte without contact with the organic solvent. When the density of the organic solvent is greater than that of the aqueous electrolyte, the organic solvent is in the lower layer, the aqueous electrolyte is in the upper layer, and zinc flakes are suspended in the aqueous electrolyte without contact with the organic solvent. According to this design, during the charging process, even if zinc dendrites are generated, by increasing the amount of the aqueous electrolyte, the zinc negative electrode may be ensured to not be in direct contact with the oxidized state of the positive electrode active material in the organic solvent, and the battery does not generate power itself. In addition, the zinc dendrites may also be broken by stirring. During the discharge process, the zinc dendrites generated by charging are oxidized and disappear, that is, the zinc dendrites are oxidized into zinc ions.

The aqueous electrolyte is an aqueous solution of sodium sulfate or magnesium sulfate containing zinc salt. According to this design, a certain concentration of sodium sulfate or magnesium sulfate may promote the layering of the aqueous solution with the organic solvent and the positive electrode active material, ensuring that the oxidized state of the positive electrode active material in the organic solvent is not in direct contact with the zinc negative electrode.

The organic ionic compound is formed by a cation and an anion, such as lithium bistrifluoromethanesulfonimide (LiTFSI), dioctyl sodium sulfosuccinate (AOT), tetra-n-butylammonium bis(trifluoromethansulfonyl)imide (TBATF SI). During charging and discharging, the anion or cation of the organic ionic compound may be migrated between the two phases of the positive electrode active material and the aqueous electrolyte to maintain the electrical neutrality of the two phases.

Further, the positive electrode current collector is formed by a porous conductive material, such as graphite felt. In one embodiment, the positive electrode current collector is located at the organic solvent or at the interface of the organic solvent and the aqueous electrolyte. In another embodiment, the positive electrode current collector is located at the positive electrode active material or at the interface of the positive electrode active material and the aqueous electrolyte. According to this design, the contact between the positive electrode active material and the positive electrode current collector may be promoted via the rotation of the positive electrode current collector, thereby improving the ability of the battery to withstand large current charge and discharge.

Further, the positive electrode active material is bromine/bromine ion, wherein bromine is the oxidized state of the positive electrode active material, and bromine ion is the reduced state of the positive electrode active material.

Alternatively, the positive electrode active material may also be tribromide ion/bromide ion, wherein the tribromide ion is the oxidized state of the positive electrode active material, and the bromide ion is the reduced state of the positive electrode active material.

Alternatively, the positive electrode active material may also be iodine/iodide ion, where iodine is the oxidized state of the positive electrode active material, and iodine ion is the reduced state of the positive electrode active material.

Alternatively, the positive electrode active material may also be triiodide ion/iodide ion, wherein the triiodide ion is the oxidized state of the positive electrode active material, and the iodine ion is the reduced state of the positive electrode active material.

Alternatively, the positive electrode active material may also be tetrachloro-p-benzoquinone/tetrachloro-p-hydroquinone, wherein tetrachloro-p-benzoquinone is the oxidized state of the positive electrode active material, and tetrachloro-p-hydroquinone is the reduced state of the positive electrode active material.

Alternatively, the positive electrode active material may also be octyl ferrocene ion/octyl ferrocene, wherein the oxidized state of the positive electrode active material is octyl ferrocene ion and the reduced state thereof is octyl ferrocene.

Alternatively, the positive electrode active material may also be 2,2,6,6-tetramethylpiperidine oxide (TEMPO), wherein TEMPO$^+$ is the oxidized state of the positive electrode active material and TEMPO is the reduced state of the positive electrode active material.

Further, the organic solvent is a fatty acid, such as hexanoic acid. Alternatively, the organic solvent may also be an ether solvent, such as tetrahydrofuran, 1,4-dioxane, and tetraethylene glycol dimethyl ether. Alternatively, the organic solvent may also be an ester solvent, such as butyl acetate.

In the organic solvents above, hexanoic acid itself is not miscible with water, and several other solvents are miscible with pure water but are not miscible with high-concentration sodium sulfate or magnesium sulfate aqueous solution, and thus are layered. Sodium sulfate or magnesium sulfate may be used as a dehydrating desiccant in organic synthesis. The binding capacity thereof with water is greater than that of the above solvents, so water is separated from the organic solvent to form a single phase. According to this design, the ratio of water in the organic solvent may be controlled by adjusting the concentration of sodium sulfate or magnesium sulfate in the aqueous electrolyte, thereby optimizing the ionic conductivity and electrochemical stability of the organic solvent. At the same time, the organic solvent containing water is not readily combusted, thus improving the safety of the battery.

Further, the battery structure is determined by the density difference between the organic solvent and the aqueous electrolyte. When the organic solvent of the battery dissolves the positive electrode active material and the density of the resulting solution is less than that of the aqueous electrolyte, the organic solvent and the positive electrode active material are in the upper layer, the aqueous electrolyte is in the lower layer, and the zinc negative electrode is immersed in the aqueous electrolyte and is not in contact with the organic solvent. When the organic solvent of the battery dissolves the positive electrode active material and the density of the resulting solution is greater than that of the aqueous electrolyte, the organic solvent and the positive electrode active material are in the lower layer, the aqueous electrolyte is in the upper layer, and the zinc negative electrode is immersed in the aqueous electrolyte and is not in contact with the organic solvent.

Further, a plurality of grooves are designed at the bottom of the container, wherein a portion of the grooves are provided with the zinc negative electrode, and another portion of the grooves are provided with the positive electrode active material and the organic solvent.

Further, the battery of the invention may be designed with two or more positive electrode current collectors. These positive electrode current collectors are no conduction with each other. While an oxidation reaction occurs on the surface of a portion of the positive electrode current collectors, a reduction reaction occurs on the surface of another portion of the positive electrode current collectors. According to this design, in the battery, the positive electrode current collector with the reduction reaction on the surface corresponds to the discharge reaction; and the positive electrode current collector with oxidation reaction on the surface corresponds to the charging reaction, and the charging and discharge reactions may be performed simultaneously at different positive electrode current collectors. When the battery is charged by the irregular power generated by wind power and solar power, the oxidized state of the positive electrode active material generated by charging may be evenly distributed in the organic solvent by convection, which enables the positive electrode current collector's reduction reaction stable, then support a continuous discharge process via stable power output.

In order to further illustrate the method of the invention, the following detailed description is given in conjunction with specific embodiments.

Embodiment 1

Figure 1:
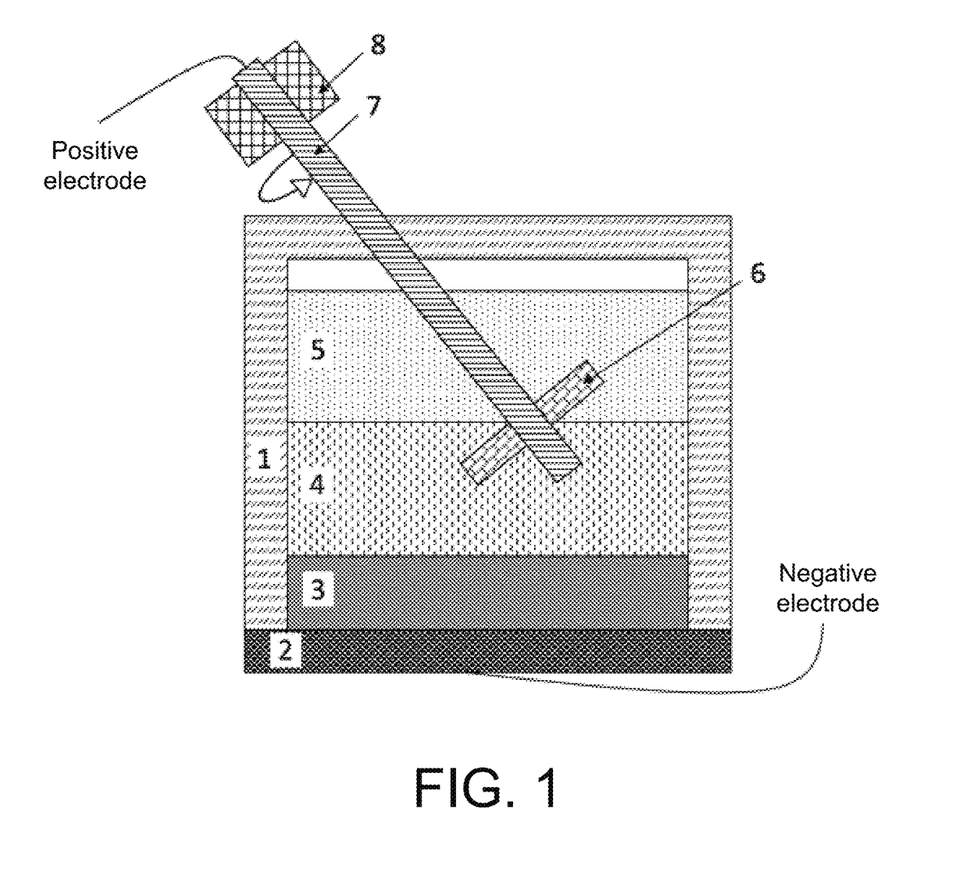
FIG. 1 is a cross-sectional view of the batteries in Embodiments 1 and 2 of the invention.

As shown in FIG. 1 of the specification, an open-top stainless-steel tank with an inner diameter of 10 cm, a wall thickness of 0.3 mm, and a height of 10 cm was used as the container. The inner wall surface thereof had a layer of polypropylene lining with a thickness of 2 mm for insulation, and the bottom thereof did not have a polypropylene lining, thus serving as the negative electrode current collector of the battery. 5 grams of zinc powder was placed in the container as the zinc negative electrode, which was in contact with the bottom of the stainless-steel tube to ensure conductivity. 30 ml of 5 mol/L zinc bromide aqueous solution was added to the container as the aqueous electrolyte. The bromine ions in the aqueous electrolyte were the reduced state of the positive electrode active material, and the oxidized state thereof was bromine and tribromide ions. Then, 30 ml of hexanoic acid was added as the organic solvent. At room temperature, hexanoic acid was only slightly soluble in water, and most of the hexanoic acid floated above the aqueous electrolyte to form an independent phase. One polypropylene lid was added on the top of the container. The lid had one obliquely drilled hole, and the inside was inserted with a carbon rod. A disc formed by 1 cm thick graphite felt was installed at an end of the carbon rod located at the hexanoic acid/aqueous electrolyte interface. The disc had a diameter of 5 cm, was perpendicular to the carbon rod, and there was an angle greater than 0° and less than 90° between the interface of hexanoic acid/aqueous electrolyte. An end of the carbon rod protruded beyond the top of the container was connected to a motor, and a built-in conductive slip ring allowed an external wire to maintain good contact with the rotating carbon rod. During the rotation of the carbon rod, the surface of the graphite felt disc was constantly converted between hexanoic acid and aqueous electrolyte to promote the mass transfer of reactants during charging and discharging. The battery may be charged at an external voltage of 1.9 V. Increasing the rotation speed of the carbon rod may increase the charging current. When the rotation speed was 5 seconds per revolution, the charging current may reach 1 A.

The charging capacity was controlled to 7000 mAh, discharge was performed afterwards, the discharge platform voltage was 1.5 V, the capacity was 6300 mAh, and the Coulombic efficiency was 90%. After 1000 cycles, no obvious changes in capacity and voltage were observed.

Embodiment 2

Using the same battery structure as in Embodiment 1, the material added in the container was changed: first, 100 grams of zinc powder was added to the container as the zinc negative electrode, and then 20 ml of a 1 mol/L zinc chloride aqueous solution was added as the aqueous electrolyte. Then, 40 ml of 1,4-dioxane solution of 1 mol/L tetrachloro-p-benzoquinone was added. Tetrachloro-p-benzoquinone was the oxidized state of the positive electrode active material and was insoluble in water, and the reduced state of the positive electrode active material was tetrachloro-p-hydroquinone.

After the battery was manufactured, the battery was in a charging state and could be directly discharged. The discharge voltage was 1.1 V, and the capacity was 2000 mAh. The charging voltage was 1.5 V and the Coulombic efficiency was 95%. After 1000 cycles, the discharge capacity was 1800 mAh.

Embodiment 3

Figure 2:
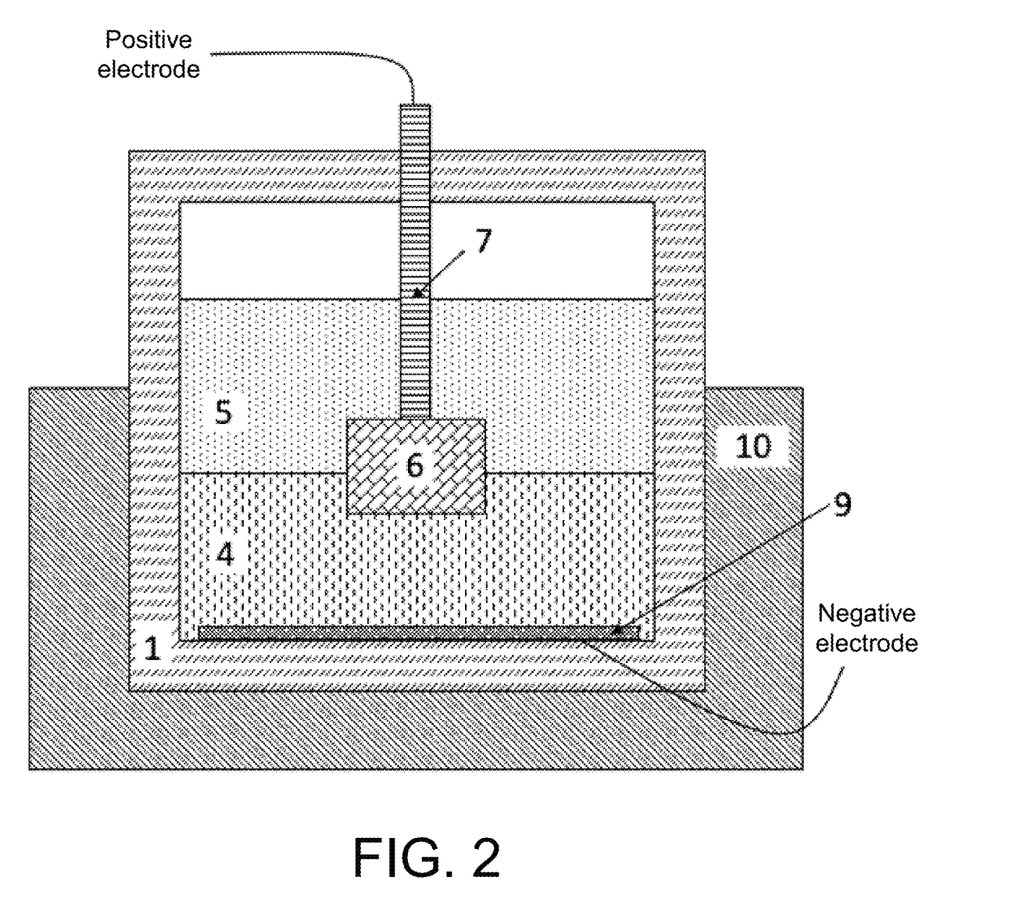
FIG. 2 is a cross-sectional view of the batteries in Embodiments 3 and 4 of the invention.

As shown in FIG. 2 of the specification, a sealed polypropylene storage tank with an inner diameter of 10 cm, a wall thickness of 0.3 mm, and a height of 10 cm was used as the container. A twisted carbon fiber was used as a wire to pass through a small hole (diameter 0.2 mm) at the bottom of the storage tank, and was in good contact with a round graphite felt with a diameter of 5 cm and a thickness of 0.5 cm at the bottom of the container, and the small hole was well sealed. 5 g of zinc was coated on the graphite felt. The advantage of using carbon fiber to connect to an external circuit was that the carbon fiber was not corroded by aqueous electrolyte and organic solution during long-term use. There was also 30 ml aqueous electrolyte in the container. The aqueous electrolyte was an aqueous solution including magnesium sulfate, zinc chloride, and ammonium chloride. The concentration of magnesium sulfate was 150 g/L, the concentration of zinc chloride was 50 g/L, and the concentration of ammonium chloride was 50 g/L. 30 ml of butyl acetate was used as the organic solvent, wherein 20 g of TEMPO was dissolved in butyl acetate, 50 g of AOT was also dissolved, and a graphite felt with a diameter of 8 cm was further used as the positive electrode current collector. The positive electrode current collector was immersed at the interface of the organic solvent and the aqueous electrolyte, and was drawn out from above the polypropylene storage tank via the carbon rod. The entire polypropylene storage tank was placed on the platform of an orbital oscillator for orbital oscillation. This design may produce convection in the organic solvent and the aqueous electrolyte of the battery, thereby improving mass transfer speed.

After the battery was manufactured, the battery was in a discharge state and the battery needed to be charged first. When the current density was 100 mA/cm$^2$ and the rotation speed was 100 r/min, the charging voltage was 1.6 V and the capacity was 1900 mAh. After charging, the positive electrode active material was changed from the reduced TEMPO to the oxidized TEMPO$^+$. After that, the battery could be discharged with a discharge voltage of 1.2 V and a Coulombic efficiency of 95%. After 1000 cycles, the discharge capacity was 1800 mAh. If the rotation speed was increased to 200 r/min, at the same current density, the charging voltage of the battery was 1.55 V, the discharging voltage was 1.3 V, the capacity could be increased to 2200 mAh, and the Coulombic efficiency was increased to 98%.

Embodiment 4

The same battery structure as in Embodiment 3 was used. The organic solvent in the container was changed to 30 ml of tetrahydrofuran, wherein 10 g of iodine and 30 g of TBATFSI were dissolved. The oxidized state of the positive electrode active material was $I_3^-$ and $I_2$, and the reduced state thereof was $I^-$.

The battery was in a charging state after manufacture and could be directly discharged, with a discharge voltage of 1.1 V and a discharge capacity of 1500 mAh. Then, charging was performed. The charging voltage was 1.5 V, and the capacity was 1300 mAh. The Coulombic efficiency was 90% during the cycles, and the discharge capacity was 1000 mAh after 1000 cycles.

Embodiment 5

Figure 3:
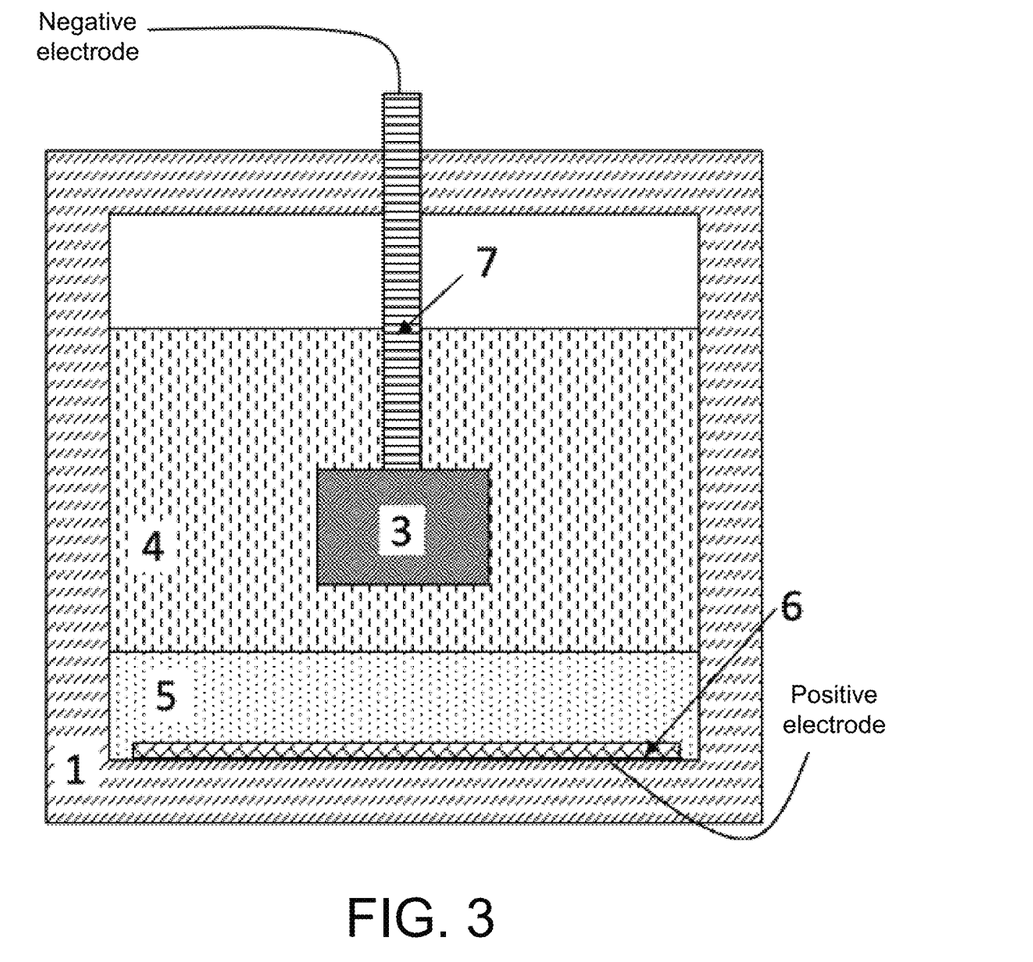
FIG. 3 is a cross-sectional view of the battery in Embodiment 5 of the invention.

As shown in FIG. 3 of the specification, a sealed polypropylene storage tank with an inner diameter of 10 cm, a wall thickness of 0.3 mm, and a height of 10 cm was used as the container. A twisted carbon fiber was used as a wire to pass through a small hole (diameter 0.2 mm) at the bottom of the storage tank, and was in good contact with a round graphite felt with a diameter of 5 cm and a thickness of 0.5 cm at the bottom of the container, and the small hole was well sealed. There was also 30 ml of aqueous electrolyte in the container. The components of the aqueous electrolyte included sodium sulfate and zinc sulfate, wherein an aqueous solution with a sodium sulfate concentration of 50 g/L and a zinc sulfate concentration of 25 g/L and 30 ml of tetraethylene glycol dimethyl ether were used as the organic solvent, wherein 30 g of octyl ferrocene and 15 g of LiTFSI were dissolved. A small hole was opened above the container, and a carbon rod was passed through the small hole. One end of the carbon rod was connected to a wire as a negative electrode, and another end was connected to a graphite felt coated with 5 g of zinc, and the contact was good. The zinc-coated graphite felt was fully immersed in the aqueous electrolyte and was not in contact with the organic solvent.

After the battery was manufactured, the battery was in a discharge state, and the battery needed to be charged first. The charging voltage was 1.6 V and the capacity was 2500 mAh. After charging, the positive electrode active material was changed from reduced octyl ferrocene to oxidized octyl ferrocene ions. Then, the battery could be discharged with a discharge voltage of 1.3 V and a Coulombic efficiency of 95%. The charge and discharge capacities were not changed significantly after 1000 cycles.

Embodiment 6

Figure 4:
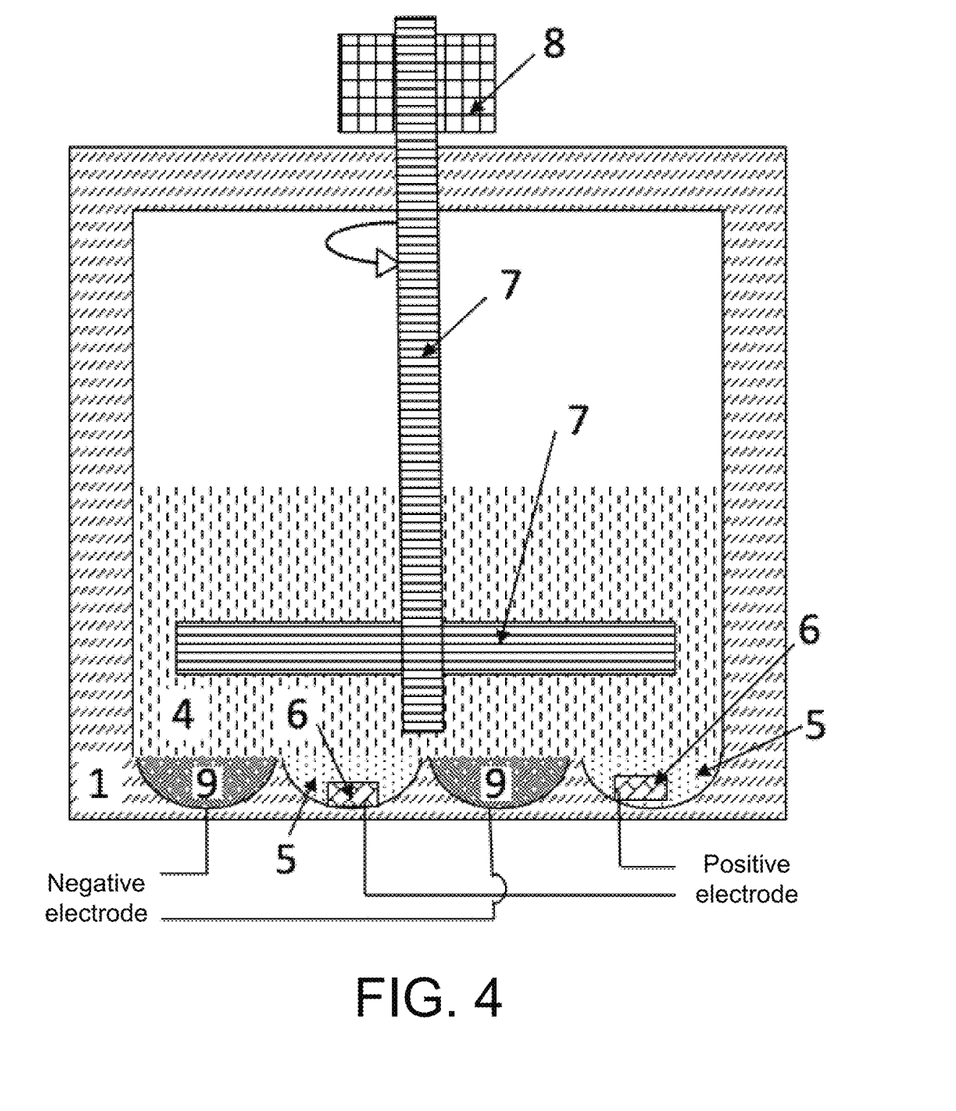
FIG. 4 is a cross-sectional view of the battery in Embodiment 6 of the invention.

As shown in FIG. 4 of the specification, the position of the carbon rod was changed to vertical, and the bottom of the polypropylene storage tank was changed to 16 hemispherical grooves with a radius of 1 cm. In particular, half of the grooves were provided with zinc-coated graphite felt, each graphite felt was coated with 1 g zinc, the size was 1 cm*1 cm*0.5 cm, and carbon fiber was used as the bottom of the grooves and the battery negative electrode current collector. Another portion of the grooves were provided with a mixture of positive electrode active material and organic ionic compound. The mixture included 30 g of positive electrode active material TEMPO and 15 g of organic ionic compound LiTFSI, and an organic solvent was not needed. The aqueous electrolyte was 30 ml in total, the aqueous electrolyte included sodium sulfate and zinc sulfate, wherein the sodium sulfate concentration was 30 g/L, and the zinc sulfate concentration was 25 g/L. According to this design, the mixture formed by TEMPO and LiTFSI with a mass ratio of 2:1 had a density greater than that of the aqueous electrolyte, so that the battery energy density was greater, the cycle Coulombic efficiency was better, and the overall battery safety and stability were higher. The positive electrode active material of the battery had an oxidized state of TEMPO$^+$ and a reduced state of TEMPO.

The battery was in a discharge state after manufacture, and the battery needed to be charged first, with a charging voltage of 1.5 V and a capacity of 3000 mAh. Then, the battery could be discharged with a discharge voltage of 1.3 V and a Coulombic efficiency of 98%. The charge and discharge capacities were not changed significantly after 1000 cycles.

Embodiment 7

Figure 5:
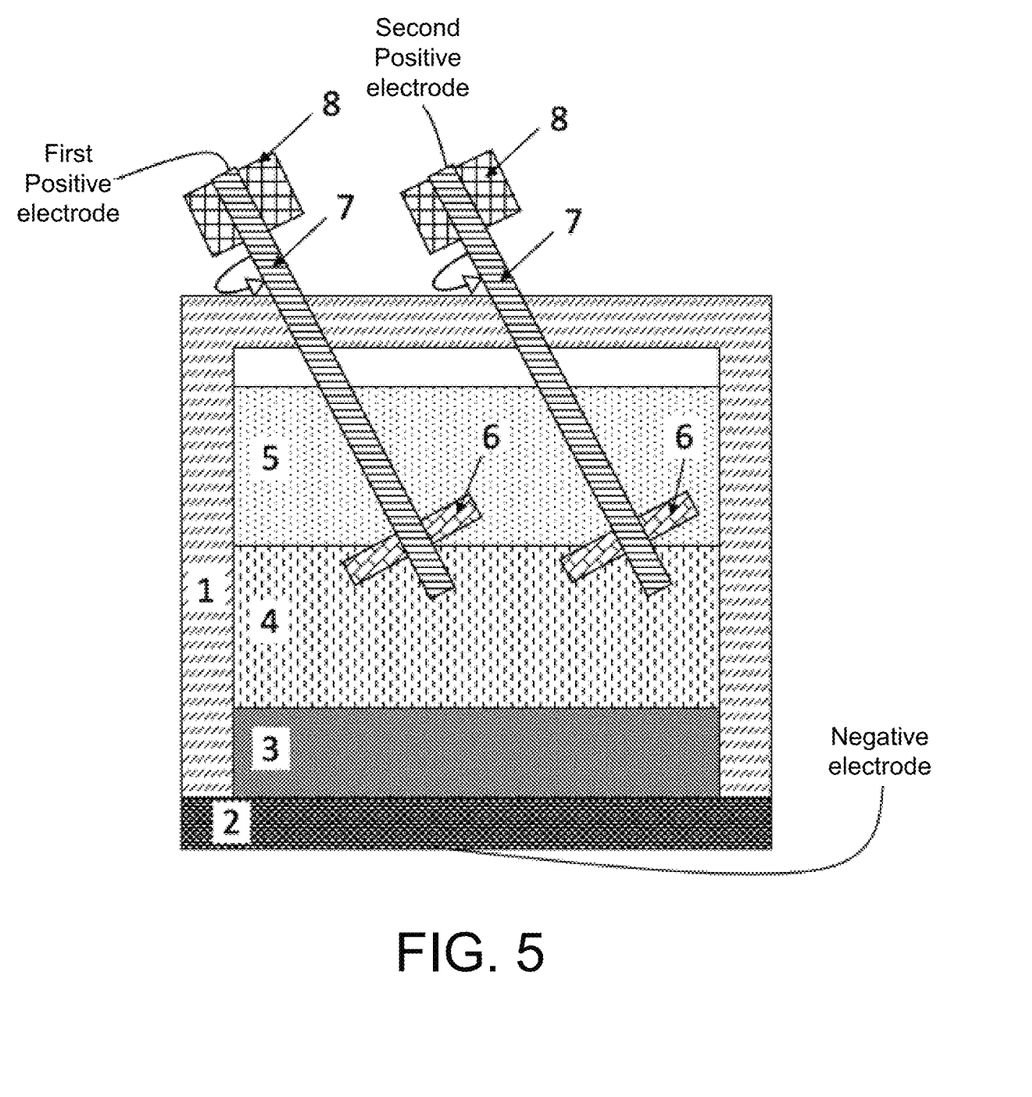
FIG. 5 is a cross-sectional view of the battery in Embodiment 7 of the invention.

As shown in FIG. 5 of the specification, the battery of Example 1 was changed to the use of two left and right positive electrode current collectors, respectively referred to as a first positive electrode and a second positive electrode. The negative electrode adopted a uniform zinc negative electrode, and was connected with an external circuit via the bottom of the stainless-steel tank. The second positive electrode was responsible for charging the battery, and the current flowing into the second positive electrode caused an oxidation reaction on the surface thereof to increase the oxidized state concentration of the positive electrode active material in the organic solvent. The first positive electrode was responsible for the discharge of the battery, and a reduction reaction occurred on the surface thereof, so that the oxidized state concentration of the positive electrode active material in the organic solvent was reduced.

The battery was assembled using the organic solvent of the same concentration as in Embodiment 1 with the positive electrode active material, the aqueous electrolyte, and the negative electrode. A solar power generation equipment was connected between the second positive electrode and the negative electrode, and the battery was charged with a charging voltage of 1.9 V. An electrical load was connected between the first positive electrode and the negative electrode, including the two motors of the battery itself and an LED lamp, to discharge the battery, and the discharge voltage was 1.5 V. The battery could work stably for 1 year.

According to this design, power generation and consumption may be independently achieved in time, and the electrical energy generated at any time may be stored in the battery via the current between the second positive electrode and the negative electrode. At any time, the demand for power consumption may also be met by power output via the discharge current between the first positive electrode and the negative electrode. As long as the oxidized state of the positive electrode active material in the organic solvent was not exhausted, the demand for power consumption may be met.

There was no direct electronic conduction between the second positive electrode and the first positive electrode, which may be independently charged and discharged, thus avoiding the charge and discharge switching necessary for the traditional battery use process with only a pair of positive and negative electrodes, and thus simplifying the battery management system and smoothing voltage output. This design is very suitable for the rational use of wind power and solar power.

In the above figures, 1 is the polypropylene lining of the container for insulation, 2 is the bottom of the stainless steel, 3 is the zinc negative electrode, 4 is the aqueous electrolyte, 5 is the mixture of organic solvent and positive electrode active material, 6 is the graphite felt with conductivity, 7 is the carbon rod, also with conductivity, 8 is the motor, with a built-in conductive slip ring provided inside, 9 is the zinc-coated graphite felt, and 10 is the orbital oscillator performing rotary motion.

It is easy for those skilled in the art to understand that the above are only preferred embodiments of the invention and are not intended to limit the invention. Any modification, equivalent replacement, and improvement made within the spirit and principles of the invention should be included in the protection scope of the invention.

What is claimed is:

1. A zinc organic battery, comprising a container, wherein the container contains a positive electrode active material, a positive electrode current collector, an organic solvent, a zinc negative electrode, and an aqueous electrolyte, wherein, the organic solvent is not miscible with the aqueous electrolyte, and the organic solvent and the aqueous electrolyte have different densities and are able to be layered under an action of gravity;

the positive electrode active material has a redox activity and has two forms—an oxidized state and a reduced state, and the two forms are able to be reversibly converted by an electrochemical reaction, molar ratios of the oxidized state and the reduced state are different, which correspond to different battery charge states, the positive electrode current collector is used to collect a current at a positive electrode;

the solubility of the oxidized state of the positive electrode active material in the organic solvent is greater than the solubility thereof in the aqueous electrolyte;

a main component of the zinc negative electrode is zinc, and the zinc negative electrode is immersed in the aqueous electrolyte and is not in contact with the organic solvent;

the aqueous electrolyte is an aqueous solution containing a zinc salt.

2. The zinc organic battery of claim 1, wherein the positive electrode active material is selected from one of the following four types:

a first type: a halogen, wherein an oxidized state thereof is an anion formed by a halogen element or three halogen atoms, and a reduced state thereof is an ion thereof, comprising $Br_2/Br^-$, $I_2/I^-$, $Br_3^-/Br^-$, $I_3^-/I^-$;

a second type: alkyl ferrocene, wherein an oxidized state thereof is an alkyl ferrocene (III) ion, and a reduced state thereof is alkyl ferrocene (II);

a third type: the positive electrode active material is 2,2,6,6-tetramethylpiperidine oxide TEMPO, a molecular formula thereof is $C_9H_{18}NO$, TEMPO$^+$ is the oxidized state of the positive electrode active material, and TEMPO is the reduced state of the positive electrode active material;

a fourth type: the oxidized state of the positive electrode active material is quinone, the reduced state thereof is corresponding phenol.

3. The zinc organic battery of claim 2, wherein the oxidized state of alkyl ferrocene comprises an octyl ferrocene ion $C_{18}H_{26}Fe$ (III)$^+$, and the reduced state of alkyl ferrocene comprises an octyl ferrocene $C_{18}H_{26}Fe$ (II).

4. The zinc organic battery of claim 2, wherein the oxidized state of the positive electrode active material comprises tetrachloro-p-benzoquinone $C_6Cl_4O_2$, and the reduced state of the positive electrode active material comprises tetrachloro-p-hydroquinone $C_6(OH)_2Cl_4$.

5. The zinc organic battery of claim 1, further comprising an organic ionic compound, wherein the organic ionic compound is used to balance a charge state of the positive electrode active material during a charge and discharge process to ensure overall electrical neutrality, and is selected from one of the following three types:

a first type: lithium bistrifluoromethanesulfonimide (LiTFSI), wherein a molecular formula thereof is: $(CF_3SO_2)_2NLi$, a second type: dioctyl sodium sulfosuccinate (AOT), wherein a molecular formula thereof is: $(COOC_8H_{17})CH_2CH(COOC_8H_{17})SO_3Na$, a third type: tetra-n-butylammonium bis(trifluoromethansulfonyeimide (TBATFSI), wherein a molecular formula thereof is: $(CF_3SO_2)_2N_2C_{16}H_{36}$.

6. The zinc organic battery of claim 1, wherein the zinc organic battery has two or more positive electrode current collectors that are not directly communicated with each other.

7. The zinc organic battery of claim 1, wherein the organic solvent is selected from an ether solvent, a fatty acid, or an ester solvent.

8. The zinc organic battery of claim 7, wherein the ether solvent comprises tetrahydrofuran, 1,4-dioxane, or tetraethylene glycol dimethyl ether, the fatty acid comprises hexanoic acid, and the ester solvent comprises butyl acetate.

9. The zinc organic battery of claim 1, wherein the positive electrode current collector is formed by a porous conductive material, the porous conductive material comprises graphite felt, the positive electrode current collector is located at the organic solvent or at the interface of the organic solvent and the aqueous electrolyte, and the positive electrode current collector is rotatable.

10. The zinc organic battery of claim 1, wherein the density of a solution formed by dissolving the positive electrode active material in the organic solvent is lower than that of the aqueous electrolyte, the organic solvent and the positive electrode active material are at an upper layer, the aqueous electrolyte is at a lower layer, and the zinc negative electrode is at a bottommost layer and immersed in the aqueous electrolyte and is not in contact with the organic solvent.

11. The zinc organic battery of claim 1, wherein the density of a solution formed by dissolving the positive electrode active material in the organic solvent is greater than that of the aqueous electrolyte, the organic solvent and the positive electrode active material are at a lower layer, the aqueous electrolyte is at an upper layer, and the zinc negative electrode is suspended in an upper half portion of the aqueous electrolyte and is not in contact with the organic solvent.

12. The zinc organic battery of claim 1, wherein a density of a solution formed by dissolving the positive electrode active material in the organic solvent is greater than that of the aqueous electrolyte, and a bottom of the container has a plurality of grooves, wherein a portion of the grooves is provided with the zinc negative electrode, and another portion of the grooves is provided with the positive electrode active material and the organic solvent.

13. A zinc organic battery, comprising a container, wherein the container contains a positive electrode active material, a positive electrode current collector, a zinc negative electrode, and an aqueous electrolyte, wherein, the positive electrode active material itself is a liquid, and the positive electrode active material and the aqueous electrolyte have different densities and are able to be layered under an action of gravity;

the positive electrode active material has a redox activity and has two forms—an oxidized state and a reduced state, and the two forms are able to be reversibly converted by an electrochemical reaction, molar ratios of the oxidized state and the reduced state are different, which correspond to different battery charge states;

the positive electrode current collector is used to collect a current at a positive electrode;

a main component of the zinc negative electrode is zinc, and the zinc negative electrode is immersed in the aqueous electrolyte and is not in contact with the oxidized state of the positive electrode active material;

the aqueous electrolyte is an aqueous solution containing a zinc salt.

14. The zinc organic battery of claim 13, wherein the positive electrode active material is selected from one of the following four types:
   a first type: a halogen, wherein an oxidized state thereof is an anion formed by a halogen element or three halogen atoms, and a reduced state thereof is an ion thereof, comprising $Br_2/Br^-$, $I_2/I^-$, $Br_3^-/Br^-$, $I_3^-/I^-$;
   a second type: alkyl ferrocene, wherein an oxidized state thereof is an alkyl ferrocene (III) ion, and a reduced state thereof is alkyl ferrocene (II);
   a third type: the positive electrode active material is 2,2,6,6-tetramethylpiperidine oxide TEMPO, a molecular formula thereof is $C_9H_{18}NO$, $TEMPO^+$ is the oxidized state of the positive electrode active material, and TEMPO is the reduced state of the positive electrode active material;
   a fourth type: the oxidized state of the positive electrode active material is quinone, the reduced state thereof is corresponding phenol.

15. The zinc organic battery of claim 14, wherein the oxidized state of alkyl ferrocene comprises an octyl ferrocene ion $C_{18}H_{26}Fe$ $(III)^+$, and the reduced state of alkyl ferrocene comprises an octyl ferrocene $C_{18}H_{26}Fe$ (II).

16. The zinc organic battery of claim 14, wherein the oxidized state of the positive electrode active material comprises tetrachloro-p-benzoquinone $C_6Cl_4O_2$, and the reduced state of the positive electrode active material comprises tetrachloro-p-hydroquinone $C_6(OH)_2Cl_4$.

17. The zinc organic battery of claim 13, further comprising an organic ionic compound, wherein the organic ionic compound is used to balance a charge state of the positive electrode active material during a charge and discharge process to ensure overall electrical neutrality, and is selected from one of the following three types:
   a first type: lithium bistrifluoromethanesulfonimide (LiTFSI), wherein a molecular formula thereof is: $(CF_3SO_2)_2NLi$,
   a second type: dioctyl sodium sulfosuccinate (AOT), wherein a molecular formula thereof is: $(COOC_8H_{17})CH_2CH(COOC_8H_{17})SO_3Na$,
   a third type: tetra-n-butylammonium bis(trifluoromethansulfonyl)imide (TBATFSI), wherein a molecular formula thereof is: $(CF_3SO_2)_2N_2C_{16}H_{36}$.

18. The zinc organic battery of claim 13, wherein the zinc organic battery has two or more positive electrode current collectors that are not directly communicated with each other.

19. The zinc organic battery of claim 13, wherein the positive electrode current collector is formed by a porous conductive material, the porous conductive material comprises graphite felt, the positive electrode current collector is located at the positive electrode active material or at the interface of the positive electrode active material and the aqueous electrolyte, and the positive electrode current collector is rotatable.

* * * * *